United States Patent
Husser et al.

(10) Patent No.: US 9,238,962 B2
(45) Date of Patent: Jan. 19, 2016

(54) PORE PRESSURE FROM SPECTROSCOPY AND SONIC DATA

(75) Inventors: Alexis S. Husser, Richmond, TX (US); Colin Michael Sayers, Katy, TX (US); Aron Kramer, Katy, TX (US); John P. Horkowitz, Sugar Land, TX (US); Geoff Weller, Berowra Heights (AU)

(73) Assignee: Schlumberger Technology Corporation, Sugar Land, TX (US)

( * ) Notice: Subject to any disclaimer, the term of this patent is extended or adjusted under 35 U.S.C. 154(b) by 935 days.

(21) Appl. No.: 13/329,411

(22) Filed: Dec. 19, 2011

(65) Prior Publication Data

US 2012/0215451 A1 Aug. 23, 2012

Related U.S. Application Data

(60) Provisional application No. 61/425,624, filed on Dec. 21, 2010.

(51) Int. Cl.
*G06F 19/00* (2011.01)
*E21B 47/10* (2012.01)
*E21B 47/16* (2006.01)
(Continued)

(52) U.S. Cl.
CPC ............... *E21B 47/101* (2013.01); *E21B 49/00* (2013.01); *E21B 47/14* (2013.01); *E21B 47/16* (2013.01); *E21B 49/006* (2013.01); *E21B 49/008* (2013.01);
(Continued)

(58) Field of Classification Search
CPC ............ G01V 1/40; G01V 3/18; G01V 5/04; G01V 3/34; G01V 3/36; G01V 3/38; E21B 49/00; E21B 49/002; E21B 49/006; E21B 49/008; E21B 47/14; E21B 47/16
USPC .......................................................... 702/11
See application file for complete search history.

(56) References Cited

U.S. PATENT DOCUMENTS 4,899,112 A   2/1990   Clark et al.
5,142,471 A   8/1992   Desbrandes
(Continued)

FOREIGN PATENT DOCUMENTS

GB    2448206 A    10/2008
WO    0194982 A2   12/2001
(Continued)

OTHER PUBLICATIONS

Herron, et al., "Quantitative Lithology: An Application for Open and Cased Hole Spectroscopy", SPWLA 37th Annual Logging Symposium, 1996, 14 pages.
(Continued)

*Primary Examiner* — John Breene
*Assistant Examiner* — Lynda Dinh
(74) *Attorney, Agent, or Firm* — Kimberly Ballew

(57) ABSTRACT

A logging tool capable of making different types of measurements is provided, and a plurality of measurements on a formation are obtained. Certain mineral properties of the formation are assumed and a mixed properties theorem for the formation is invoked. Upper and lower velocity limits for sonic waves traveling through the formation are determined using the above information. Biot's constant is also computed using the above information. LWD data on the formation is obtained and an effective stress is determined. A total stress is determined and, from that and the other information, a pore pressure is determined.

22 Claims, 3 Drawing Sheets

(51) Int. Cl.
*E21B 49/00* (2006.01)
*G01V 3/36* (2006.01)
*E21B 47/14* (2006.01)
*G01V 3/34* (2006.01)
*G01V 3/38* (2006.01)

(52) U.S. Cl.
CPC ... *G01V 3/34* (2013.01); *G01V 3/36* (2013.01); *G01V 3/38* (2013.01)

(56) References Cited

U.S. PATENT DOCUMENTS

| | | | | |
|---|---|---|---|---|
| 6,766,854 | B2* | 7/2004 | Ciglenec | E21B 7/06 166/250.11 |
| 8,195,399 | B2* | 6/2012 | Gladkikh | G01V 3/32 324/303 |
| 8,341,984 | B2* | 1/2013 | Bachrach et al. | 70/18 |
| 2007/0143021 | A1* | 6/2007 | Griffiths | G01V 11/00 702/6 |
| 2009/0145600 | A1 | 6/2009 | Wu et al. | |
| 2010/0004866 | A1* | 1/2010 | Rabinovich | G01V 3/28 702/7 |
| 2010/0258304 | A1 | 10/2010 | Hegeman | |
| 2011/0022320 | A1* | 1/2011 | Abousleiman | G01V 11/00 702/12 |
| 2013/0229892 | A1* | 9/2013 | Skjei et al. | 367/73 |

FOREIGN PATENT DOCUMENTS

| | | |
|---|---|---|
| WO | 03036044 A1 | 5/2003 |
| WO | WO 2009142873 A8 * | 6/2010 |
| WO | 2010083166 A2 | 7/2010 |

OTHER PUBLICATIONS

Holbrook, Phil, "The Relationship between Porosity, Mineralogy, and Effective Stress in Granular Sedimentary Rocks", SPWLA 36th Annual Logging Symposium, 1995, 12 pages.
Search Report issued in GB1121952.4 on Mar. 9, 2012, 3 pages.
Additional Search Report issued in GB1121952.4 on Jun. 29, 2012, 1 page.

* cited by examiner

PORE PRESSURE FROM SPECTROSCOPY AND SONIC DATA

RELATED APPLICATIONS

This application claims, under 35 U.S.C. 119(e), priority to and the benefit of U.S. Provisional Application No. 61/425,624 filed Dec. 21, 2010.

BACKGROUND

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. By collecting and processing such information during the drilling process, the driller can modify or correct key steps of the operation to optimize performance.

MWD tools typically provide drilling parameter information such as weight on the bit, torque, temperature, pressure, direction, and inclination. LWD tools typically provide formation evaluation measurements such as resistivity, porosity, and NMR distributions. MWD and LWD tools often have components common to wireline tools (e.g., transmitting and receiving antennas), but MWD and LWD tools must be constructed to not only endure but to operate in the harsh environment of drilling. The terms MWD and LWD are often used interchangeably, and the use of either term in this disclosure will be understood to include both the collection of formation and wellbore information, as well as data on movement and placement of the drilling assembly.

Logging tools can also be used to image a wellbore. For example, measurements of resistivity, density, the photoelectric factor, natural gamma ray radiation, the dielectric constant, and acoustic impedance (e.g., ultrasonics) have been used to form wellbore images. Most, if not all, of those imaging methods are dependent on the type of drilling fluid ("mud") used.

SUMMARY

A logging tool capable of making different types of measurements is provided, and a plurality of measurements on a formation are obtained. Certain mineral properties of the formation are assumed and a mixed properties theorem for the formation is invoked. Upper and lower velocity limits for sonic waves traveling through the formation are determined using the above information. Biot's constant is also computed using the above information. LWD data on the formation is obtained and an effective stress is determined. A total stress is determined and, from that and the other information, a pore pressure is determined. This summary is provided to introduce a selection of concepts that are further described below in the detailed description. This summary is not intended to identify key or essential features of the claimed subject matter, nor is it intended to be used as an aid in limiting the scope of the claimed subject matter.

FIGURES

Embodiments of a borehole imaging and formation evaluation logging-while-drilling tool are described with reference to the following figures. The same numbers are generally used throughout the figures to reference like features and components.

It should be understood that the drawings are not to scale and that the disclosed embodiments are sometimes illustrated diagrammatically and in partial views. In certain instances, details that are not necessary for an understanding of the disclosed method and apparatus or that would render other details difficult to perceive may have been omitted. It should be understood that this disclosure is not limited to the particular embodiments illustrated herein.

DETAILED DESCRIPTION

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate.

Figure 1:
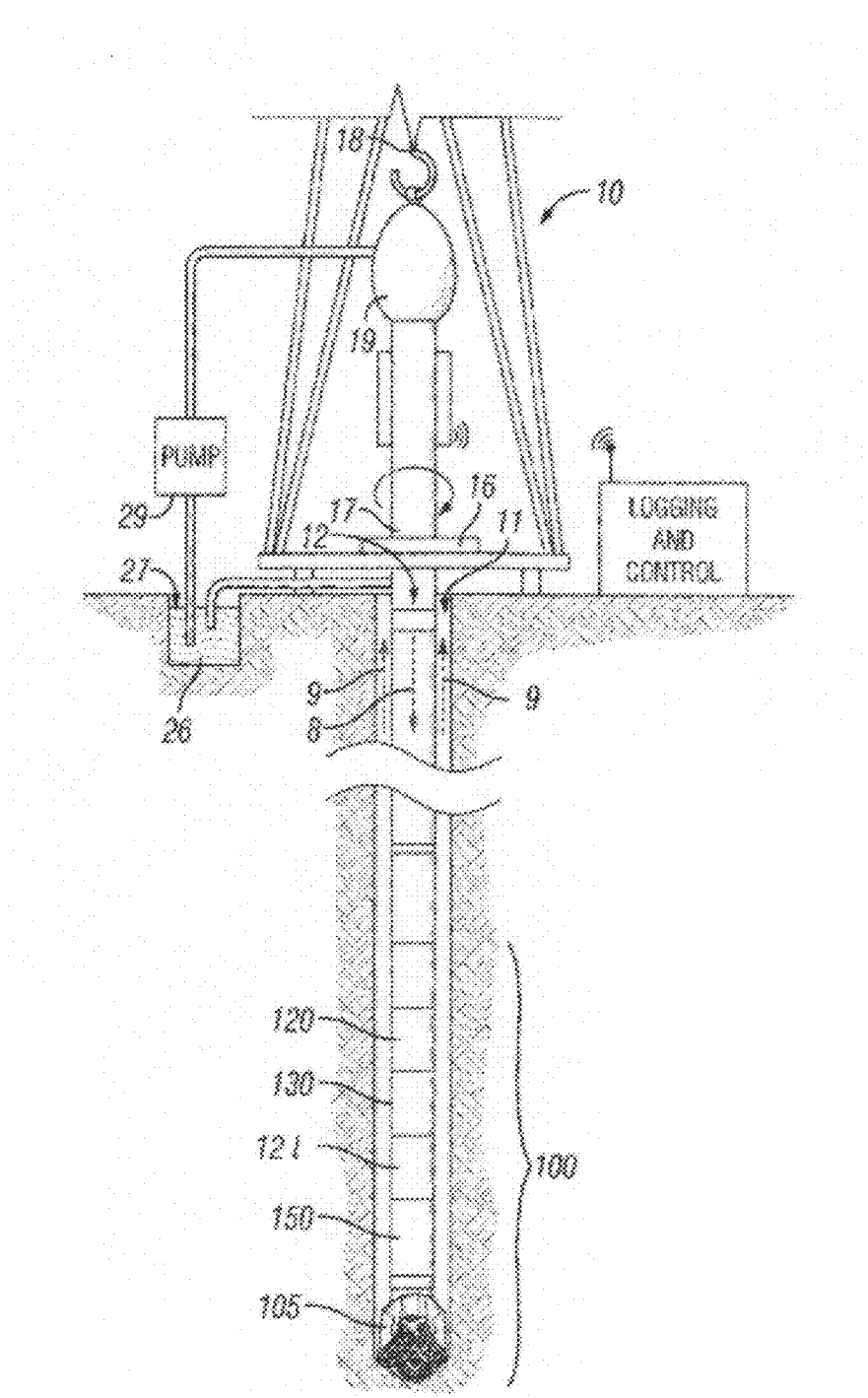
FIG. 1 illustrates a prior art well site system.

FIG. 1 illustrates a well site system in which various embodiments can be employed. The well site can be onshore or offshore. In this example system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor 150, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 121. (References, throughout, to a module at the position of 120 can alternatively mean a module at the position of 121 as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Figure 2:
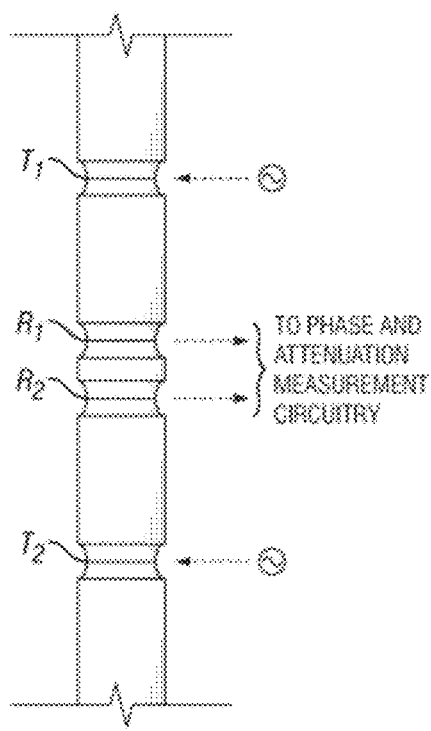
FIG. 2 shows a prior art logging tool.

An example of a tool which can be the LWD tool 120, or can be a part of an LWD tool suite 121, is shown in FIG. 2. As seen in FIG. 2, upper and lower transmitting antennas, $T_1$ and $T_2$, have upper and lower receiving antennas, $R_1$ and $R_2$, therebetween. The antennas are formed in recesses in a modified drill collar and mounted in MC or insulating material. The phase shift of the electromagnetic wave between the receivers provides an indication of formation resistivity at a relatively shallow depth of investigation, and the attenuation of the electromagnetic wave between the receivers provides an indication of formation resistivity at a relatively deep depth of investigation. U.S. Pat. No. 4,899,112 can be referred to for further details. In operation, attenuation-representative signals and phase-representative signals are coupled to a processor, an output of which is coupleable to a telemetry circuit.

Some electromagnetic (EM) logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. A triaxial antenna is one in which three antennas (i.e., antenna coils) are arranged to be mutually orthogonal. Often one antenna (coil) is axial and the other two are transverse. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

A tool and method to determine pore pressure by combining spectroscopy data and acoustic or sonic data is disclosed. Acoustic data depends primarily on two parameters: the velocities of the solids and fluids making up the formation, and the stresses under which those solids and fluids exist. Combining quantitative values from spectroscopy measurements with known physical properties of formation materials, known stress states, and measured acoustic data allows one to determine the stress that is carried by the solids and the fluids within the formation. The determination of pore pressure in the formation may be made in real-time (e.g., while drilling), or using a wireline tool with a data recording mode for further analysis.

The primary spectroscopy measurement is elemental fraction. Based on elemental fractions, one can determine the mass fraction of specific elements. Using the mass fractions, one can calculate the volumetric quantities of specific minerals, such as quartz-feldspar-mica, clay, calcite, dolomite, pyrite, anhydrite, siderite, coal, and salt. In addition, a tool capable of multiple measurement types can provide porosity, density, sigma, resistivity, and gamma ray measurements. Those may be used in tandem to determine the volumetric fractions of hydrocarbon, bound water, irreducible water, and free water, as well as the density of the rock matrix. In effect, the volume fraction of every component of the rock may be determined.

Using a mixed-properties theorem, the mechanical properties of a rock as a whole can be determined if the physical properties of the individual constituents are known. There are at least two known approaches. In one, known as the Hashin-Shtrikman method, the maximum and minimum bulk and shear moduli are determined. The theorem states that any arrangement of the constituents can be no more stiff nor compliant than the corresponding upper and lower limits imposed by those moduli. Those values can be converted to velocity limits using known mechanical relationships. The velocity limits are representative of two situations. The lower limit represents a fluid suspension of the solid constituents whereby the fluid carries all of the total stress and the solids do not contribute. This is known as the mud-line velocity of the mixture. The upper limit represents the matrix velocity whereby the solid constituents carry all of the total stress and the pore pressure does not contribute.

A second approach, known as the Kuster-Toksoz formulation, determines the dry-frame modulus (bulk modulus of the mixture in which all pores are air-filled) and the solid modulus (bulk modulus of the solid mixture only). Biot's constant describes the pore space stiffness based on those two moduli and, in effect, describes the contribution of pressure within the pore space to the total mixture supporting a hydrostatic force.

When LWD sonic data is acquired, the actual velocity of the mixture may be used in another formulation to determine the effective stress. Bower's equation is perhaps the simplest expression of this relationship. However, since in Bower's equation the velocity approaches infinity as the effective stress approaches infinity, Terrell Miller has proposed an asymptotic limit of the velocity as the effective stress approaches infinity. Miller uses an empirical constant in his equation. The empirical constant, however, can be replaced with other values based on the total stress state and mechanical properties of the mixture. The equations can be modified or others deemed more suitable, specifically with respect to the determination of the upper and lower velocity limits and the dry-frame and solid moduli.

A mixed properties theorem may be used to determine upper and lower velocity limits for a given mixture of solids and fluids in a formation if one has a plurality of measurements such as spectroscopy, neutron porosity, density, sigma, resistivity, and gamma ray count rates available. The mixed properties theorem and plurality of data allow one to determine the Biot value for the mixture. Using LWD sonic data, one may determine the effective stress based on the relationship between the sonic data and the determined upper and lower velocity limits. The total stress may be determined from a known integrity test or leak-off test and overburden calculations, and, from the total stress, the effective stress, and the Biot value, one may determine the pore pressure.

Figure 3:
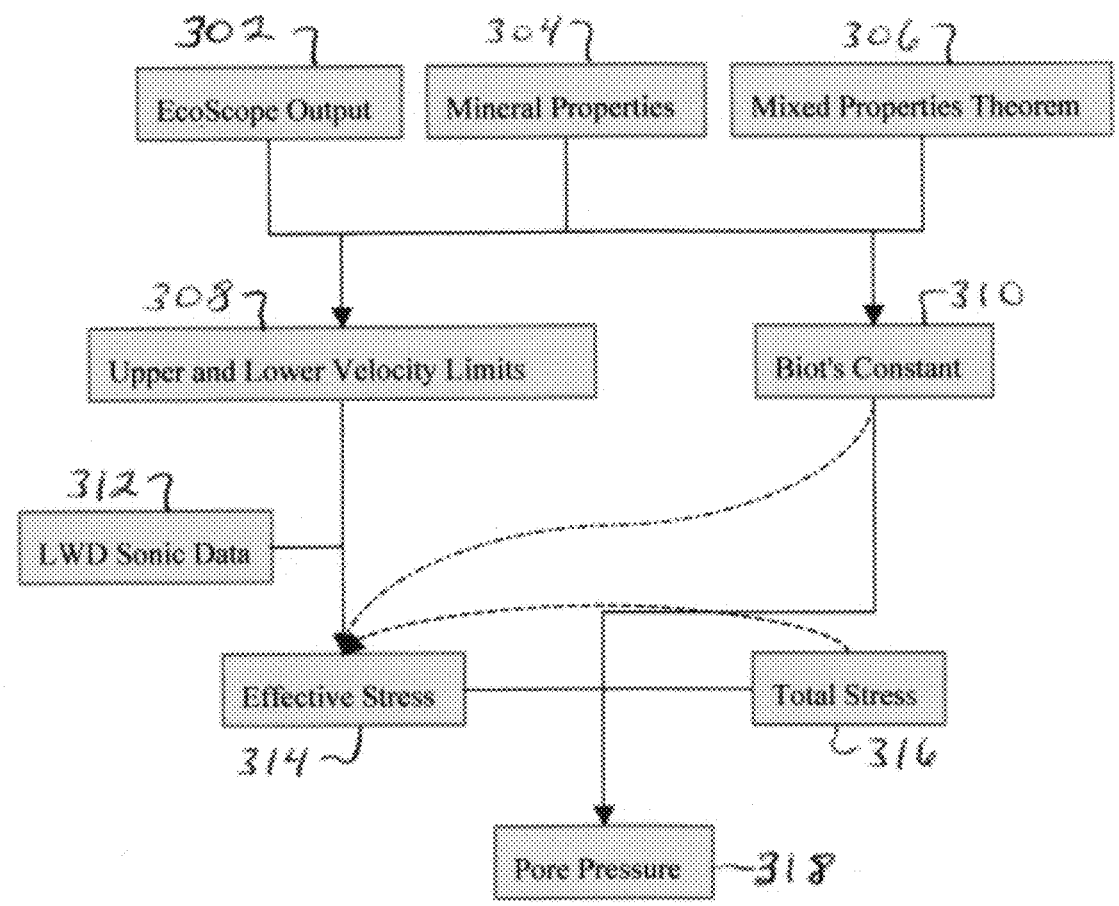
FIG. 3 shows a flowchart in which pore pressure is determined, in accordance with the present disclosure.

FIG. 3 shows a flowchart in which pore pressure is determined. A plurality of measurements on a formation are obtained (302), certain mineral properties are assumed (304), and a mixed properties theorem is invoked (306). From those, upper and lower velocity limits for acoustic waves traveling through the formation are determined (308), and Biot's constant is computed (310). LWD data is obtained (312) and used in conjunction with the determined upper and lower velocity limits to determine the effective stress (314). The total stress is determined (316), and using the total stress, the effective stress, and the Biot value, the pore pressure is determined (318).

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

The invention claimed is:

1. A method, comprising:
    obtaining a plurality of spectroscopy measurements on a formation using a spectroscopy sensor on a logging tool;
    obtaining a plurality of acoustic measurements on the formation using an acoustic sensor on the logging tool;
    determining, using a processor, an upper velocity limit and a lower velocity limit for sonic waves traveling through the formation using the spectroscopy measurements;
    determining, using the processor, Biot's constant using the spectroscopy measurements;
    determining, using the processor, an effective stress using the acoustic measurements and the upper and lower velocity limits;
    determining, using the processor, a total stress using the effective stress; and
    determining, using the processor, a pore pressure using the total stress, the effective stress, and the Biot's constant.

2. The method of claim 1, further comprising determining volumetric fractions of components comprising the formation.

3. The method of claim 2, wherein the components comprising the formation are selected from the group consisting of hydrocarbons, bound water, irreducible water, and free water.

4. The method of claim 1, further comprising determining a density of a rock matrix of the formation.

5. The method of claim 1, further comprising determining mechanical properties of the formation as a whole based on known physical properties of individual constituents of the formation.

6. The method of claim 1, further comprising determining a maximum bulk modulus, a minimum bulk modulus, a maximum shear modulus and a minimum shear modulus using a mixed properties theorem.

7. The method of claim 6, further comprising determining the upper velocity limit and the lower velocity limit using known mechanical relationships.

8. The method of claim 1, further comprising determining a dry-frame modulus and a solid modulus using a mixed properties theorem.

9. The method of claim 8, further comprising determining a pore space stiffness using the determined dry-frame modulus and the determined solid modulus.

10. The method of claim 1, wherein the logging tool is configured to obtain one or more additional measurements selected from the group consisting of neutron porosity, density, capture cross-section, resistivity, and gamma ray count rates.

11. The method of claim 1, wherein the acoustic measurements comprise formation acoustic velocity information, the method further comprising determining the effective stress using the formation acoustic velocity information.

12. The method of claim 1, further comprising determining the total stress from a known integrity test or a leak-off test and overburden calculations.

13. The method of claim 1, wherein determining the upper velocity limit and the lower velocity limit for sonic saves traveling through the formation comprises using the spectroscopy measurements and estimated mineral properties of the formation as inputs into a mixed properties theorem.

14. The method of claim 1, wherein the spectroscopy measurements comprise elemental fraction measurements, and further comprising:
    determining mass fractions of elements in the formation using the elemental fraction measurements;
    determining volumetric quantities of minerals in the formation using the mass fractions of the elements; and
    determining volumetric fractions of components in the formation using the volumetric quantities of the minerals.

15. A system, comprising:
    a logging tool configured to:
        obtain spectroscopy measurements on a formation using a spectroscopy sensor on the logging tool; and
        obtain acoustic measurements on the formation using an acoustic sensor on the logging tool;
    a processor; and
    a memory system comprising one or more non-transitory computer-readable media storing instructions that, when executed by the processor, cause the system to perform operations, the operations comprising:

receive the spectroscopy measurements and the acoustic measurements from the logging tool;
determine an upper velocity limit and a lower velocity limit for sonic waves traveling through the formation using the spectroscopy measurements and a mixed properties theorem, wherein the mixed properties theorem uses the spectroscopy measurements and estimated mineral properties of the formation as inputs;
determine Biot's constant using the spectroscopy measurements and the mixed properties theorem;
determine an effective stress using the acoustic data and the upper and lower velocity limits;
determine a total stress using the determined effective stress; and
determine a pore pressure using the determined total stress, the determined effective stress, and the computed Biot's constant.

16. The system of claim 15, wherein the operations further comprise receiving one or more additional measurements from the logging tool selected from the group consisting of neutron porosity, density, capture cross-section, resistivity, and gamma ray count rates.

17. The system of claim 15, wherein the acoustic data comprises formation sonic velocity information.

18. The system of claim 15, wherein the logging tool is a wireline tool.

19. The system of claim 15, wherein the processor has a data recording device.

20. A method, comprising:
obtaining spectroscopy measurements on a formation using a spectroscopy sensor on a logging tool;
obtaining acoustic measurements on the formation using an acoustic sensor on the logging tool;
determining, using a processor, volumetric fractions of components in the formation from the spectroscopy measurements;
determining, using the processor, a lower velocity limit in the formation using the volumetric fractions of the components and a mixed properties theorem, wherein fluid in the formation carries a stress at the lower velocity limit;
determining, using the processor, an upper velocity limit in the formation using the volumetric fractions of the components and the mixed properties theorem, wherein solids carry the stress at the upper velocity limit;
determining, using the processor, the stress that is carried by the solids and the fluids within the formation using the spectroscopy measurements, the acoustic measurements, the lower velocity limit, and the upper velocity limit; and
determining, using the processor, a pore pressure in the formation using the determined stress.

21. The method of claim 20, wherein the determination of the pore pressure in the formation is made in real-time.

22. The method of claim 20, wherein the determination of the pore pressure in the formation is made using a wireline tool with a data recording mode.

* * * * *